Dec. 24, 1957     T. J. CRAWFORD     2,817,364
WELDED TUBING
Filed Nov. 13, 1952
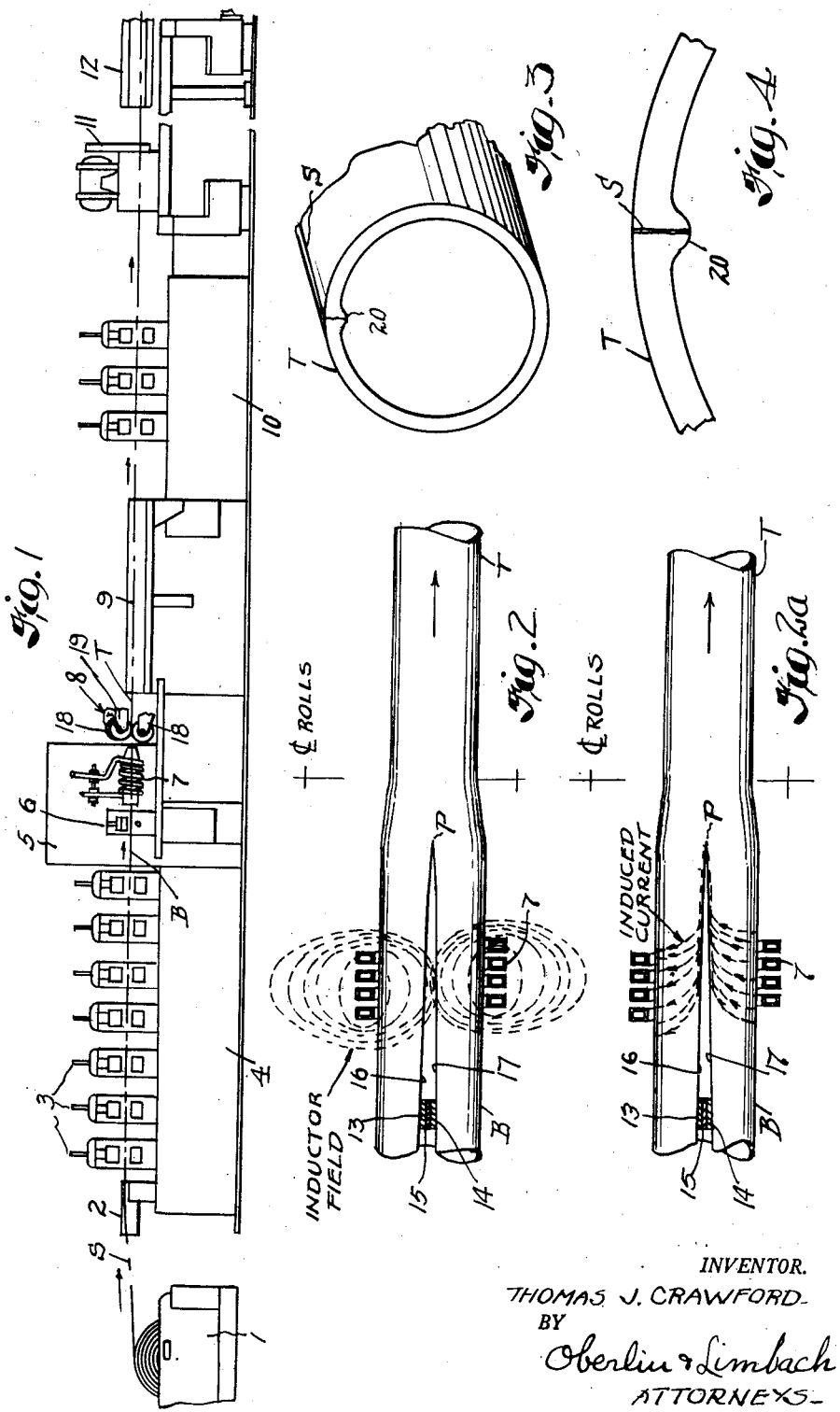
INVENTOR.
THOMAS J. CRAWFORD
BY
Oberlin & Limbach
ATTORNEYS

United States Patent Office 2,817,364
Patented Dec. 24, 1957

2,817,364

WELDED TUBING

Thomas J. Crawford, Berkley, Mich.

Application November 13, 1952, Serial No. 320,201

14 Claims. (Cl. 138—74)

This invention relates as indicated to welded tubing, and more particularly to welded tubing of a novel type produced by a high frequency induction welding operation. This application is a continuation-in-part of my co-pending application Serial No. 205,511, filed January 11, 1953, "High Frequency Induction Tube Welding," and now Patent No. 2,687,464.

Many attempts have been made to produce metal tubing by forming flat strips to the desired tubular form and then welding the resultant opposed seam edges together by application of electrical energy thereto. The well-known Yoder electric resistance-weld tube mills which are now extensively employed utilize a pair of rotary electrodes positioned above the formed tube blank and engaging such blank to either side of the seam. The resistance to passage of the electric current across such seam serves to melt the abutting edges for an instant, rendering the pressure of closely adjacent squeeze rolls effective to press and forge such edges together to unite the same by complete fusion into one homogeneous mass of metal which actually is found to be stronger than the unwelded portion of the tube wall. While this method of welding has met with great commercial success, there are nevertheless factors which definitely limit practicable welding speeds, and therefore the rate of production of the finished tubing, inasmuch as it is, of course, possible to preform the flat metal strip into the tubular blank at a very high speed indeed. Careful adjustment and supervision of the welder is required and the rotary electrodes must be trimmed or replaced when worn or when a slightly different size tubing is to be produced. Certain metals such as aluminum, stainless steel and silicon bronze are, moreover, very difficult to weld in this manner. Very thin walled tubing has always been extremely difficult to weld due to inability to withstand the heavy external pressures necessarily imposed thereon, a wall about .028 inch in thickness being the thinnest successfully welded by resistance methods.

Attention has been given to the possibility of heating the opposed seam edges to welding temperature by means of a current induced in the tube blank itself as taught, for example, in Adams Patents Nos. 2,181,445 and 2,335,894, a relatively high voltage, low frequency current being induced to cause arcing between the spaced seam edges to raise the same to welding temperature prior to passage between appropriate squeeze rolls. It has also been suggested to utilize a high frequency induced current, as in Leonard Patent 2,205,424, with such current being localized and concentrated at a point within the confines of an induction coil encircling the tube blank and with the seam edges being forced together into welding engagement at such point. Due to operational difficulties, neither of these last-mentioned methods has ever enjoyed substantial commercial use.

It is accordingly a principal object of my invention to provide welded tubing both ferrous and non-ferrous having a welded seam which is extremely narrow and having metallurgical characteristics closely similar to those of the body of the tube.

Another object of my invention is to provide extremely thin walled tubing which may, for example, have a wall thickness of approximately .012 inch in the case of a one inch O. D. tube.

Still another object is to provide such welded tubing in which the welded seam is exceptionally strong and capable of withstanding subsequent working operations together with the body of the tube.

A further object is to provide welded aluminum tubing which is of substantial metallurgical uniformity in the body of the tube, the weld zone adjacent the welded seam, and the welded seam itself.

Other objects of my invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 1 is a diagrammatic elevational view of a tube mill adapted to be utilized in production of my new tubing, most of the units comprising the same being of standard type and commercially available in the Yoder mill above mentioned;

Figs. 2 and 2a are diagrammatic top plan views of a portion of the continuously traveling tube blank, explanatory of the manner in which the welding operation is performed;

Fig. 3 is an end view, in perspective, of a length of welded tubing in accordance with the present invention; and Fig. 4 is a fragmentary elevational view showing the seam portion of such tubing on an enlarged scale.

Referring now more particularly to Fig. 1 of the drawing, the flat metal strip S is withdrawn from the coil box or uncoiler 1 and passes through an edge scarfing device 2 to the power driven roll stands 3 of the forming mill 4, such rolls being operative to the advance such strip while progressively forming the same to desired tubular cross-section. The tube blank thus preformed now advances to the welder 5 which comprises a seam guide unit 6, a high frequency induction coil 7, and a squeeze roll unit 8. The welded tube next passes through the water cooling section 9, sizing and straightening unit 10, and thence to flying cut-off 11 and run-out table 12 where the lengths of finished tubing are collected and bundled. An external bead or flash trimmer (not shown) may also be located intermediate the squeeze roll unit and the cooling section. All of the units above referred to and which together comprise the complete mill are of well-known construction and commercially available with the exception of the welder 5 comprising such seam guide 6, induction means 7, and the squeeze rolls 8.

The mechanical details of such welder and squeeze roll assembly are, moreover, fully illustrated and described in my patent incorporated by reference in the foregoing, and such units will be discussed further here only in general terms and primarily with respect to the functions they serve in the preferred manner of producing my improved welded tubing.

Thus the seam guide 6 comprises two flat metal blades or fins 13 and 14 separated by a layer of insulating material 15 (Figs. 2 and 2a) and preferably both supported in an insulated mounting capable of adjustment vertically and also transversely of the path of travel of the tube blank B, the latter adjustment providing over-correction of the circumferential position of the seam in the event that the same is rotated out of proper alignment. By insulating the wear resisting blades 13 and 14 from each other, and also preferably from their mounting, the passage of current across the seam at this point is obviously prevented, it being appreciated that the seam guide will ordinarily be located quite close to the induction unit 7. The effect of the guide is to position and space apart the opposed seam edges 16 and 17 of the tube blank B immediately prior to passage of such blank through the induction coil thereby properly positioning such seam for conjoint action of the squeeze rolls and also, in cooperation with such rolls, determining the angle of approach of the opposed seam edges at the point of welding. Such guide may be dispensed with entirely under certain circumstances where the tube forming mechanism is so arranged and adjusted otherwise as to form a tubular blank with the seam properly positioned and the opposed seam edges properly spaced. The exact position of the seam is of more importance when adjacent squeeze rolls are arranged to engage the tubing closely to each side of the welded seam than when a ceramic squeeze roll, for example, is mounted directly to overlie the seam. The seam guide, when utilized, will be of slightly greater thickness than the width of the seam coming from the forming mill so as to be effective to spread the seam somewhat, and the sides of the guide may desirably be slightly tapered toward the point of welding, the seam edges usually approaching each other at a fairly uniform angle.

The squeeze roll unit 8 located immediately subsequent to the induction coil 7 is mounted for adjustment toward and away from the coil along the path of travel of the work. Circumferentially grooved squeeze rolls 18, preferably of non-magnetic material such as bronze, are supported by arms or bars 19 in such arrangement as to engage and bear against substantially the entire periphery of the tube being welded. The precise transverse contour of the grooves in such rolls will, of course, depend upon the size and shape of the tubes. The rolls are radially adjustable and an appropriate cutting tool may be provided to trim away any external bead in well-known manner. When, however, the formation of an internal bead is not objectionable in view of the use to which the tubing is intended to be put, one of the rolls may be disposed to bear against the tubing in the region of the seam, forcing inwardly any bead which may be formed and thus obviating a subsequent trimming operation. In this arrangement, the seam engaging roll will desirably be ceramic so that flash will not tend to adhere thereto and no current will pass through the same. The number of rolls employed may be varied as best suited for particular operations.

Induction coil 7 will preferably be formed of electrolytic copper tubing so that a cooling medium, such as water, can be circulated therethrough. When very high frequencies are to be utilized, it will be advantageous to heavily silverplate the outer surfaces of the coil. The turns of the coil may be of rectangular cross-section, as indicated in Figs. 2 and 2a, for maximum efficiency, and where very small sizes of tubing are to be welded, I prefer to use an additional internal inductor element rather than to provide a coil of extremely small diameter. Such an internal inductor or concentrator generally would comprise a cylindrical copper shell about the work passage and fitting closely within the coil 7, but insulated therefrom, for example by tape wound upon the shell. Alternatively, a slight air gap may be provided between the shell and coil, particularly when the same are independently supported.

Inductor coil 7 is energized by a conventional high frequency generator. Various types of high frequency generators are commercially available such as the Westinghouse, G. E., and Reliance Electric rotating generators, the Ajax electrothermic or Corrugated Quench Gap Co. spark gap type generator, the oscillating arc type generator and the Allis-Chalmers, Westinghouse, and G. E. vacuum tube oscillators. I have found the Allis-Chalmers vacuum tube oscillator sold under the trade name "Electronic Heater" particularly satisfactory for my purpose, and for operations where welding from ½ inch to 2 inch O. D. tubing having a wall thickness of as much as 1/16 inch such oscillator having a rated output of 20 kilowatts at 400 kilocycles is suitable. An oscillator having an output of as much as 50 or 100, or even more, kilowatts may in some cases be employed. The rectifier may be air-cooled and the oscillator water-cooled, and they are commercially available with such cooling systems. The commercially available Allis-Chalmers rectifier may desirably be slightly modified by providing the same with an output filter to minimize the "ripple" component in the output voltage and thereby correspondingly minimize the modulation of the high frequency current so that periodic fluctuation of the welding heat which may otherwise be apparent when welding at high speeds (60 feet per minute, or greater) is substantially eliminated. Such rectifier may also be modified by substitution of thyratron tubes (ionic conduction tubes with grid control) for some of the two-element mercury vapor tubes usually provided, thereby facilitating adjustment of the welding heat. Alternatively, a saturable reactor may be included in the power lead to the rectifier for the same purpose. It may additionally be desirable to incorporate means for compensating for fluctuations in the line voltage.

This Allis-Chalmers "Electronic Heater" vacuum tube oscillator has the further advantage for my purpose of incorporating provision for inductive coupling of substantially all of the oscillating tank circuit inductance into the output or work coil circuit; the low power factor of the work coil or inductor together with its load makes this type of couple highly desirable to obtain efficiency of operation when the work is of non-ferrous or non-magnetic material. The entire tank inductance coil is used as the primary coil. A capacitor may desirably be connected in parallel with the inductor or the output circuit of the oscillator to increase the efficiency of the latter.

The most desirable frequency to be employed will, of course, vary somewhat depending upon the particular operation contemplated, it being necessary to consider the diameter of the tube, the permeability and the electrical resistance of the metal of which the tube is formed, the welding temperature of the particular metal, the specific heat of the metal and the rate at which the welding operation is to be performed. In ordinary operations, I have found 9600 cycles to be a practical effective minimum, although in exceptional cases when welding very large diameter thick-walled tubing a frequency as low as 3000 cycles may on occasion be employed. While the heat input may, of course, be varied by adjusting the initial generator voltage (i. e. that of the power source), the operation will be less efficient if the frequency employed is grossly different from that determined to be desirable as a result of the above considerations.

When welding certain metals and alloys such as, for example, "Everdur" (a silicon bronze alloy), there may be a tendency to form oxide inclusions in the weld, and it is important either to prevent the formation of such oxides or to flux the same way during the welding operation. This can be accomplished by introducing an inert gas such as helium to the welding region to prevent oxide formation or introducing natural gases or the like having entrained therein a solution of methyl borate in acetone, this latter serving as an excellent flux particularly effective when welding steel, copper alloy tubing and the like. The employment of an inert gas such as argon, helium or nitrogen for welding aluminum tubing in accordance with the invention is of further important advantage in that formation of aluminum oxide in the weld burr is inhibited. Subsequent burr or bead trimming operations are therefore facilitated and abrasive action on a trimming tool, where one is used, minimized. It will, of course, be understood that the particular gaseous medium may vary depending upon the particular welding operation, and in many instances there may be no need for the same.

In Figs. 2 and 2a, I have illustrated diagrammatically the field and resulting induced current conditions whereby the edges of the blank are heated to the temperature for welding. The open seam of the preformed tube blank B is, as previously explained, spread by the seam guide 13, 14 and 15 and brought into proper circumferential register with respect to the squeeze rolls. Such seam guide is relatively thick as compared to similar guides proposed in prior art attempts and is also relatively close to the squeeze roll unit (although the inductance coil is of course interposed therebetween) so that the opposed seam edges are too widely spaced apart to permit any appreciable arcing thereacross under conditions of use and approach each other at an angle which is not as acute as in prior art attempts. Consequently, the current produced by the voltage induced circumferentially of tube blank B within the confines of the inductor field must of necessity travel longitudinally of the blank to pass across the seam at or beyond the point of welding P and beyond the confines of such inductor field (see Fig. 2a). The fact that the seam edges approach each other at a relatively large angle not only discourages arcing but also renders it a simple matter to maintain such point of juncture uniform in relation to the inductor and squeeze roll units. Where the seam edges have in the past been caused to approach each other at a very acute angle, there has been a decided tendency for the point of welding juncture P to shift back and forth with the result that sometimes holes were burned in the welded seam and at other times only intermittent "stitching" was accomplished.

Tube blank B passes from the seam guide unit (when such is employed) immediately to the inductor unit, traveling axially through the coil 7 and the concentrator if the latter be utilized. Such concentrator will ordinarily only be used when welding the small diameter tubes, as for example, one-half inch O. D., or less. When no such concentrator is employed the coil 7, ordinarily one or more turns of water-cooled ¼ inch copper tubing, will similarly closely encircle the tube blank B. The number of turns of the coil will be selected to obtain the maximum power output for the particular oscillator employed. The path followed by the high frequency current produced in the tube blank is shown in Fig. 2a, the generally circumferential portion thereof lying substantially within the confines of the field of coil 7.

In selecting the frequency of the current to be passed through such coil, weight will be given to the following considerations. The induced voltage will be proportional to the frequency and to the cross-sectional area defined by the tube and this latter is proportional to the square of the diameter whereas the resistance of the tube is directly proportional to the diameter. Consequently, the frequency which need be employed will decrease with increase in the tube diameter.

Likewise, when welding a metal having a high welding temperature, a relatively high frequency must be employed to raise the seam edges to such temperature.

Similarly, the greater the specific heat of the metal being welded, the higher the frequency which must be employed. It will, of course, be appreciated that the foregoing explanation assumes that other factors are maintained constant since the rate of travel of the tube blank may, for example, be adjusted to compensate for some of the variables referred to. From a practical operating point of view, however, such speed of travel must be maintained at a mechanically and commercially feasible rate.

The frequency employed in practice may ordinarily range from about 9,600 to 450,000 cycles, and may exceed 500,000 cycles for very small diameter tubes, 10,000,000 cycles or more theoretically being feasible. In the case of very large diameter tubes the frequency may be as low as 2800 cycles, although this will probably be a rare occurrence.

The voltage appearing across the seam edges ahead of the point of welding will be insufficient to cause any appreciable arcing between the seam. However, just as such edges are brought together at the point of welding sputtering may take place which has the effect of cleaning the opposed edge surfaces. The voltage selected will, of course, depend on the material to be welded and speed of operation. For reasons explained below, under usual operating conditions, if the voltage is raised to a too high level the result will be to burn out the metal.

Despite the proximity of the inductor unit to the squeeze rolls the latter will be relatively little affected thereby, being substantially outside the field of such inductor. It is nevertheless generally desirable to employ non-magnetic materials for the rolls, and where a roll is used directly over the welded seam it should preferably be of insulating and refractory material such as bonded sapphire or vitreous alumina. Sapphire rolls are suitable but rather expensive. Due to the fact that my new process acts to concentrate the welding heat at the point of welding to a very high degree it is not generally necessary to exert such heavy pressures on the squeeze rolls as in the past and this facilitates employment of such rolls. Furthermore, thin-walled aluminum tubing and the like may be welded without danger of crushing the same.

As indicated in Fig. 2a, the current induced in the tube blank by the inductance coil flows circumferentially of the blank but being unable to jump the open seam it crosses over at the point of juncture of the seam edges. The squeeze rolls are adjusted so that such point of juncture is slightly in advance of the center line of the squeeze rolls and consequently the interfused edges of the seam are thereupon slightly urged together in a subsequent forging operation by action of the rolls. This forging operation affords improved grain structure in the weld and ensures a perfect joint with no pin-holes.

The point of bringing together the opposed seam edges relative to the inductor is critical. Such point must be spaced axially from the confines of the effective voltage-inducing portion of such inductor and from the effective limits of its field so that the current induced in the tube blank will be caused to flow substantially entirely lengthwise of such blank along paths converging at such point. The "skin effect" and "proximity effect" of such induced current consequently concentrate the welding current (and the heat developed thereby) at an extremely localized point (the point of juncture of the seam edges) without greatly heating the body of the tube. Thus, if the seam edges were brought into contact before passage through the inductor there would be slight resistance heating at such edges but no great concentration of current density at a single point. If the seam edges were brought together within the confines of the coil or even closely beyond such confines but still within the effective field of such coil, the heating effect would be somewhat enhanced but there would be a very large power loss and the process would not be commercially feasible. By bringing the opposed seam edges together a proper distance beyond the inductor the induced current is caused to concentrate at such edges and particularly at the point of contact of the latter. The most efficient use is accordingly made of the power applied without unduly heating the body of the tube either circumferentially or longitudinally beyond the exact point of welding. Since high frequency currents do not penetrate much below the surface of the metal conductor and tend to follow the path of least impedance (the vector sum of resistance and reactance), it will readily be seen that the current induced in the tube blank will pass circumferentially of the inner and outer surfaces of the latter and then along the opposed surfaces of the seam edges to the point of welding contact P of such edges (Fig. 2a). This "skin effect" is much enhanced in the region of the seam edges by the "proximity effect" resulting from the opposite directions of flow of the induced current along the opposed seam edges. At the point of seam edge juncture these two effects result in an extremely high current density being achieved.

Thus it will be seen that the opposed seam edges are not highly pre-heated (since there is no arcing) and it is only as such edges closely approach the point of juncture that the rapidly increasing current density is effective highly to heat such edges. Just as the edges are about to touch each other the low voltage employed may be sufficient to cause sputtering and this has the advantage of cleaning the juxtaposed surfaces as in a flash weld, particularly advantageous in the case of aluminum. The seam edges are not raised to welding temperature (i. e. the temperature at which they will normally interfuse as contrasted to forging or upsetting temperature) until just before such point of juncture.

The increase in current density at such point of juncture is so abrupt that a substantial increase in voltage (other welding conditions remaining normal) will not cause arcing to develop back along the open seam but instead the seam will burn out where the edges are thus brought together. The process described is primarily one of resistance welding where the welding temperature which may be achieved is sufficiently high to ensure complete interfusion of the juxtaposed edges but the region where such temperature is developed is so limited that the remainder of the tube is only relatively slightly heated and energy is conserved. Of course, there are various attendant advantages such as the fact that the squeeze rolls do not become overheated, such rolls are substantially outside the field of the inductor, only a relatively low degree of pressure need be exerted thereby to achieve a perfect weld and subsequent forging of the same, a very high rate of tube blank travel (and therefore production of finished tubing) is feasible, and a considerable variation in such rate can be tolerated without corresponding regulation of the power input, squeeze roll pressures, etc. This last is of great importance inasmuch as it permits supervision of the process by a relatively unskilled operator and ensures a uniform high quality product.

At the point where the seam edges are brought together there may be a slight sputtering due to the break-down of an oxide film, such sputtering being more pronounced in the case of aluminum than steel since the insulating effect of the aluminum oxide is greater. Similarly, the sputtering is more pronounced in the case of silicon bronze than with copper. This sputtering helps to clean the opposed seam edges so that preliminary cleaning operations are unnecessary. In the case of materials such as steel having a wide plastic range, a forged weld may be obtained even when insufficient heat is supplied to produce a molten state at the point of seam edge juncture. Ordinarily, however, I prefer to generate sufficient heat to interfuse the seam edges at this point.

It is generally preferred that the frequency of the current be sufficiently high that effective current penetration will be no more than about 10 one-thousandths of an inch below the surface of the converging seam edges closely in advance of the point of juncture. In the case of very large diameter tubes, however, where somewhat lower frequency ranges may desirably be utilized, this degree of penetration may be considerably exceeded.

Accordingly, a continuous length of metal strip is formed to general tubular conformation with opposed spaced edges defining a longitudinally extending open seam, a high-frequency alternating magnetic field is induced within and around a relatively short longitudinally extending portion of such preformed tube blank, such blank being continuously advanced through the effective region of such field, such opposed seam edges are brought together at a point spaced a sufficient distance from such region in the direction of travel of such blank that the induced voltage across the spaced seam edges will be substantially lower immediately prior to such point than in such effective region of such field, thereby causing the induced current to flow along the opposed seam edge surfaces to such point, where an extremely high current density is obtained due to the combined result of the skin effect and proximity effect, such high current density being effective to heat the seam edge surfaces to fusion temperature to interfuse the same, and thereafter such interfused edges are forced further together in a forging or upsetting operation. Considering that normally desirable tube wall thicknesses are several times the depth of effective current penetration at the frequencies ordinarily contemplated, if the seam edge surfaces are brought into contact within the effective field of the inductor coil the current density effective at the point or, rather, radial line of junction of such seam edge surfaces will be far from uniform in distribution from the inner surface to the outer surface of the blank and the tendency will be to overheat the outside of the seam and to leave the inner portion of the seam unwelded. By causing the seam edge surfaces to meet a substantial distance beyond the effective limit of the field of the inductor the axial magnetic flux produced by the inductor coil which causes the aforesaid uneven current distribution is not present in the region immediately ahead of such point of meeting to cause such uneven current distribution and the predominant field in this region, being that produced by the welding current itself, has instead the effect of concentrating such current uniformly across the opposed seam edge surfaces due to the skin effect and proximity effect. Hence, the weld produced is uniform throughout its depth even when the tube wall thickness is relatively great, as, for example, equal to 12% of the tube outer diameter.

When welding the smaller diameters of tubing such as a five-eighth inch to one and one-half inch diameter tubing, the point of welding will ordinarily be a distance beyond the region of high flux density equal to from about one to about two diameters of the tube being produced. However, when relatively large diameter tubing is welded, such as tubing from four to eight inches in diameter, the point of welding will ordinarily be somewhat closer to the region of high flux density in terms of tube diameters since the inductor will be more tightly coupled to the tube acting as the secondary, there being no need to increase such mechanical spacing in proportion to the tube size. The point of welding can, in fact, sometimes be removed as much as five tube diameters from the end of the inductor coil, for example, although this will of course be relatively inefficient due to greater power input requirements. Similarly, the point of welding should not too closely approach the effective limit of the inductor field since the induced current will not then be sufficiently concentrated in the seam edges to be efficiently utilized, and in materials having a narrow melting temperature range the highly heated region will be relatively wide with resultant collapse or at best an extremely wide cast weld structure. Accordingly, such point of welding should ordinarily be at least one-third of the tube outer diameter beyond the end of the inductor coil and therefore spaced substantially beyond the effective limit of the inductor field. With small diameter tubing a still greater proportionate spacing is desirable, as above indicated. In the forms of inductor specifically disclosed above, such region of high flux density extends an appreciable distance axially beyond the end of the inductor but then rapidly diminishes to an insignificant value so that it may be considered effectively to terminate for all practical purposes. This effective limit of the magnetic field will ordinarily extend an axial distance from the end of the inductor coil equal to about one-quarter of the inner diameter of such coil, although varying somewhat with different coils. By "point of welding" or "point of juncture" as used herein I mean that point at which the juxtaposed seam edges are initially brought into contact beyond the inductor and interfused as a result of the current concentration at such point, this ordinarily being somewhat in advance of the center line of the squeeze rolls. As a practical matter, the immediate subsequent forging step is both mechanically convenient and advantageous but, of course, may be largely dispensed with if the squeeze rolls are carefully adjusted and the tube blank perfectly preformed so that the seam edges will be brought together into welding engagement very close to the center line of the rolls.

The foregoing technique is useful not only in the welding of carbon steel tubing, but also in welding tubing of stainless steel, silicon bronze (Everdur), copper, brass, aluminum, and various non-ferrous alloys. By way of illustration only, examples of metal tubing actually welded in the manner described include:

Nickel (type A; Monel type B; Inconel)
Silicon bronze (Everdur)
Phosphor bronze
Phosphorus deoxidized copper
Gilding metal (95% copper, 5% zinc)
Cartridge brass (70% copper, 30% zinc)
Leaded brass
Stainless steel (austenitic type 304; austenitic type 302; Ferritic type 430)
10–10 carbon steel
Aluminum and its alloys (99.6% pure; and types 2S, 3S, 4S, 14S, 24S, 52S, 56S, 61S, 75S, R301, R307, clad R307)

Tubing can thus readily be produced having a cast weld seam of a thickness no greater than 20% of the wall thickness of the body of the tube. In fact, in many cases cast weld is produced which is no wider than 3% of the wall thickness, due in part to extrusion of molten metal by pressure of the squeeze rolls. It will be recalled that the opposed surfaces of the seam edges will ordinarily be brought to molten condition at the point of welding but that the body of the tube is relatively unaffcted even in close proximity to such seam edges. The metallurgical characteristics of the finished article will therefore ordinarily be substantially unchanged from those of the original blank from which the tube is formed and by performing a subsequent sizing operation slightly reducing the diameter of the finished article, the cast weld metal of the seam will be preferentially worked and the characteristics of the entire tube rendered still more uniform.

This relationship of the seam width to the thickness of the wall is clearly evident in the typical section of such tubing illustrated in Figs. 3 and 4, wherein the cast weld seam is designated by reference character S. In this case, the tubing was welded with one of the squeeze rolls bearing against the seam and the bead 20 thus forced to the inside.

The extremely narrow welded seam of my new tubing places such tubing in an entirely new category in the art. It has long been known in the brazing art, as for example in the silver soldering of stainless steel, that a butt joint formed by an extremely thin film or layer of silver solder will have very high tensile strength despite the fact that such solder is itself a material of relatively low tensile strength. The tensile strength of the brazed joint increases as the thickness of the solder layer decreases until a thickness on the order of .003 inches or less is approached. For the first time in the tube welding art I have produced resistance welded tubing wherein the cast weld metal comprising the welded seam proper (derived from the metal of the body of the tube) forms such a thin layer that the increased tensile strength phenomenon referred to above is afforded.

Moreover, preferential cold working of the weld adequately to restore strain hardened characteristics to the cast weld metal generally comparable to the body of the tube may require as much as 50% plastic deformation of the weld metal. Such a degree of cold working or "sizing" is not ordinarily feasible with a wide weld (as when the cast weld seam has a width equal to the thickness of the tube wall or more) since this metal can only be extruded radially and the resultant wide ridge would not be tolerated. Moreover, any such operation would be mechanically quite difficult, requiring at least several drastic passes. With the very narrow cast weld seams of my new tubing, however, there is no difficulty in achieving such 50% deformation of the weld, and an extremely high quality uniform product is obtained. In prior art methods of welding aluminum, for example, the cast weld portion has always been at least as wide as the material was thick and generally very much wider.

The very narrow molten or plastic region produced at the weld may then be further reduced by the forging operation of the squeeze rolls, such operation serving to squeeze much of the affected metal out of the seam in the form of a bead. Consequently, the weld proper, while it may be of the cast-weld type, is then extremely narrow. The usual later sizing operation (reducing the tube diameter slightly) affords preferential cold working of this narrow weld, since the cast weld is of softer metal than the body of the tube, and the degree of such cold working of the weld is of course accentuated by the extreme narrowness of the latter. Thus, only a small reduction in tube diameter nevertheless affords quite considerable cold working of the weld. The tubing produced in accordance with my invention therefore not only retains the desirable qualities of the strip stock from which it is formed but also is exceptionally uniform with regard to such qualities even in the weld zone.

I have thus been enabled to produce resistance-welded tubing of carbon steel and stainless steel having a wall thickness of as little as .012 inch and even less, and likewise to produce such tubing of aluminum and other non-ferrous metals and their alloys having a wall thickness much less than ever before possible, with a cast-weld longitudinally extending seam the width of which is no greater than approximately 20% of the wall thickness. Such tubing may readily be corrugated, for example, by well-known procedures without damage thereto at the welded seam or weld zone. Aluminum alloys such as 14S, 24S and 75S of the precipitation hardening types may be solution heat treated at approximately 900–950° F., quenched in water in the usual manner at room temperature, and thereafter held at a temperature below 32° F. until ready to form and weld. Such treatment by refrigeration inhibits precipitation hardening which would otherwise make the welding operation difficult due to the heterogeneous phases present. The strip or blank will now be formed and welded while still in solid solution condition (metallurgically homogeneous). Due to the very narrow fusion zone and the extremely rapid rate of cooling in this area from the welding temperature, substantially no precipitation results in the areas adjacent the weld and no "over-aging" takes place, so that when subsequent precipitation treatment at room or a more elevated temperature takes place the entire body of the tubing will have substantially uniform characteristics.

I have been able readily to form resistance-welded tubing having a cast-weld seam which is no wider than approximately 20% of the tube wall thickness even when the latter does not exceed 3–12% of such diameter, tubing of such proportions being considered relatively thin-walled in the trade. In the welding of non-ferrous metals, including magnesium and titanium and their alloys, the process is far more suitable than any previously available. Titanium is, of course, extremely difficult to extrude. Aluminum and a number of other metals have quite narrow melting ranges and if the welding apparatus and method do not afford a sufficiently high temperature gradient narrowly to localize the welding temperature region then an undesirably wide case seam will result. Thus, old butt-welding procedures develop high temperatures through a substantial body of the material. The austenitic stainless steels such as types 302 and 304 behave generally similarly to non-ferrous metals when welded in accordance with my invention since they are non-magnetic and have a narrow welding temperature range. On the other hand, the ferritic stainless steels such as type 430 behave more like carbon steel in that their welding temperature range is broader and the hysteresis heating incidental to welding of magnetic materials by my process increases the breadth of the heat-affected zone at the weld seam.

Other modes of applying the principle of the invention may be employed, change being made as regards the details described, provided the features stated in any of the following claims or the equivalent of such be employed.

I therefore particularly point out and distinctly claim as my invention:

1. As a new article of manufacture, thin-walled resistance-welded aluminum alloy tubing having a longitudinally continuous cast-weld seam of the same metal the width of which is uniform and no greater than approximately 20% of the wall thickness.

2. As a new article of manufacture, thin-walled resistance-welded non-ferrous metal tubing having a longitudinally continuous cast-weld seam of the same metal the width of which seam is no greater than approximately 20% of the tubing wall thickness.

3. As a new article of manufacture, resistance-welded substantially non-magnetic metal tubing having a straight longitudinally continuous cast-weld seam of the same metal as the body of said tubing, said tubing having a wall thickness of not over .012 inch, and the width of said cast-weld seam being no greater than approximately 20% of the tube wall thickness.

4. As a new article of manufacture, resistance-welded substantially non-magnetic metal tubing having a straight longitudinally continuous cast-weld seam of the same metal as the body of said tubing, the width of said cast-weld seam being uniform and no greater than approximately 20% of the tube wall thickness and the metal of said seam being substantially identical metallurgically to that of the body of said tubing.

5. As a new article of manufacture, resistance-welded substantially non-magnetic nickel alloy tubing having a longitudinally continuous cast-weld seam of the same metal, and the width of said cast-weld seam being no greater than approximately 20% of such tube wall thickness.

6. As a new article of manufacture, resistance-welded substantially non-magnetic stainless steel tubing having a longitudinally continuous cast-weld seam of the same metal, and the width of said cast-weld seam being no greater than approximately 20% of such tube wall thickness.

7. As a new article of manufacture, resistance-welded copper alloy tubing having a longitudinally continuous cast-weld seam of the same metal, and the width of said cast-weld seam being no greater than approximately 20% of such tube wall thickness.

8. As a new article of manufacture, resistance-welded titanium tubing having a longitudinally continuous cast-weld seam of the same metal, and the width of said cast-weld seam being no greater than approximately 20% of such tube wall thickness.

9. As a new article of manufacture, resistance-welded magnesium tubing having a longitudinally continuous cast-weld seam of the same metal, and the width of said cast-weld seam being no greater than approximately 20% of such tube wall thickness.

10. As a new article of manufacture, austenitic stainless steel welded tubing having a longitudinally continuous welded seam of the same metal analysis as the body of said tubing and with a continuous cast-weld structure substantially uniform throughout the wall thickness and the width of which seam does not exceed approximately 20% of such wall thickness.

11. As a new article of manufacture, resistance welded aluminum alloy tubing having a wall thickness on the order of about .05 inch and a straight narrow cast weld longitudinally continuous seam the width of which is uniform and no greater than approximately 20% of the tube wall thickness, by virtue of which said seam exhibits a greater joint tensile strength than the tensile strength of the same cast weld metal isolated, and the metal of said seam being of the same metal analysis as the body of said tubing and derived therefrom.

12. As a new article of manufacture, welded substantially non-magnetic metal tubing having a welded seam with a cast weld structure the width of which is substantially uniform and no greater than approximately 20% of the tube wall thickness, said welded seam being of the same metal as the body of said tubing.

13. As a new article of manufacture, welded non-ferrous substantially non-magnetic metal tubing having a longitudinally continuous welded seam the width of which is uniform and no greater than approximately 20% of the tube wall thickness, said welded seam being of the same metal as the body of said tubing.

14. As a new article of manufacture, non-ferrous substantially non-magnetic welded tubing having a straight longitudinally continuous welded seam of the same metal analysis as the body of said tubing and with a continuous cast weld structure substantially uniform throughout the wall thickness, and the width of which seam does not exceed approximately 20% of such tubing wall thickness, such seam thereby comprising a cast weld joint so thin as to exhibit the high tensile characteristics of a thin brazed joint stronger than the body of said tubing.

References Cited in the file of this patent

UNITED STATES PATENTS

| | | |
|---|---|---|
| 1,435,306 | Johnston | Nov. 14, 1922 |
| 1,488,585 | Bundy | Apr. 1, 1924 |
| 1,767,220 | Malm | June 24, 1930 |
| 1,895,133 | Quarnstrom | Jan. 24, 1933 |
| 1,930,191 | Bundy | Oct. 10, 1933 |
| 2,023,086 | LaVallee | Dec. 3, 1935 |
| 2,030,906 | Malley | Feb. 18, 1936 |
| 2,147,868 | Von Henke | Feb. 21, 1939 |
| 2,296,435 | Giard | Sept. 22, 1942 |
| 2,388,563 | Nock | Nov. 6, 1945 |
| 2,417,594 | Fleche | Mar. 18, 1947 |
| 2,629,806 | Anderson | Feb. 24, 1953 |
| 2,629,811 | Cachat | Feb. 24, 1953 |
| 2,630,514 | Schaefer | Mar. 3, 1953 |
| 2,687,464 | Crawford | Aug. 24, 1954 |

OTHER REFERENCES

Ser. No. 174,078, Durr (A. P. C.), published May 11, 1943.